US009639333B2

(12) United States Patent
Geng et al.

(10) Patent No.: US 9,639,333 B2
(45) Date of Patent: *May 2, 2017

(54) METHOD AND SYSTEM FOR MODEL DRIVEN DEVELOPMENT (71) Applicant: International Business Machines Corporation, Armonk, NY (US)

(72) Inventors: Shao M. Geng, Beijing (CN); Timothy J. Hahn, Cary, NC (US); David L. Kaminsky, Chapel Hill, NC (US); Ying Liu, Beijing (CN); David M. Ogle, Powell, OH (US); Xi Ning Wang, Beijing (CN); Tian L. Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,888

(22) Filed: Jul. 17, 2015

(65) Prior Publication Data
US 2016/0092178 A1  Mar. 31, 2016

Related U.S. Application Data (63) Continuation of application No. 14/799,602, filed on Jul. 15, 2015.

(30) Foreign Application Priority Data

Sep. 25, 2014  (CN) .......................... 2014 1 0498508

(51) Int. Cl.
*G06F 9/44* (2006.01)
*G06F 11/32* (2006.01)
*G06F 9/45* (2006.01)

(52) U.S. Cl.
CPC .................. *G06F 8/35* (2013.01); *G06F 8/34* (2013.01); *G06F 8/427* (2013.01); *G06F 11/323* (2013.01)

(58) Field of Classification Search
None
See application file for complete search history.

(56) References Cited

U.S. PATENT DOCUMENTS 5,297,248 A * 3/1994 Clark ..................... G06F 11/323
345/440
6,332,212 B1 * 12/2001 Organ ................... G06F 11/323
714/E11.181

(Continued)

OTHER PUBLICATIONS

Steffen et al., "Model-Driven Development with the jABC," 2007, Hardware and Software, Verification and Testing vol. 4383 of the series Lecture Notes in Computer Science, pp. 92-108.*

(Continued)

*Primary Examiner* — Thuy Dao
*Assistant Examiner* — Stephen Berman
(74) *Attorney, Agent, or Firm* — Reza Sarbakhsh (57) ABSTRACT

Embodiments of the present invention disclose a system and computer program product for providing a technical solution for model driven development. Program code is analyzed to determine the execution sequence of states of the program code. The program code is generated by performing a first transformation to a model. The model includes an abstract description of a business implemented by the program code. At least part of the statement of the program code is grouped into functional blocks. A visual representation of the program code is created. The visual representation is based on the execution sequence and the functional blocks. A code snipped is determined to be preserved in the program code based on a user's annotation of the visual representation. The code snippety is to be preserved in new program code (Continued)

generated by performing a second transformation to the model. The second transformation is executed after the first transformation.

18 Claims, 6 Drawing Sheets

(56) References Cited

U.S. PATENT DOCUMENTS

| | | | |
|---|---|---|---|
| 7,478,362 B2 | 1/2009 | Gutz et al. | |
| 8,418,125 B2 | 4/2013 | Hawkins et al. | |
| 8,615,729 B2 | 12/2013 | Cornell et al. | |
| 2003/0061600 A1* | 3/2003 | Bates | G06F 11/3664 717/133 |
| 2006/0031820 A1 | 2/2006 | Li | |
| 2006/0064667 A1 | 3/2006 | Freitas | |
| 2007/0266377 A1* | 11/2007 | Ivanov | G06F 8/30 717/136 |
| 2009/0119576 A1* | 5/2009 | Pepper | G06F 17/30525 715/230 |
| 2009/0150854 A1 | 6/2009 | Elaasar et al. | |
| 2009/0150855 A1 | 6/2009 | Elaasar | |
| 2010/0077386 A1* | 3/2010 | Akkiraju | G06F 8/35 717/136 |
| 2010/0138820 A1* | 6/2010 | Joshi | G06F 11/3612 717/158 |
| 2011/0078652 A1* | 3/2011 | Mani | G06F 8/10 717/105 |
| 2011/0088011 A1* | 4/2011 | Ouali | G06F 8/10 717/105 |
| 2012/0192151 A1* | 7/2012 | Parkes | G06F 8/34 717/120 |
| 2013/0055214 A1* | 2/2013 | Harrison | G06F 11/3676 717/127 |
| 2014/0090070 A1* | 3/2014 | Tripp | G06F 21/577 726/25 |
| 2014/0137077 A1* | 5/2014 | Winkler | G06F 8/34 717/105 |
| 2014/0365190 A1* | 12/2014 | Mahate | G06F 17/5009 703/7 |
| 2015/0113498 A1* | 4/2015 | Wiese | G06F 8/35 717/104 |
| 2016/0062742 A1* | 3/2016 | Marin | G06F 8/35 717/108 |

OTHER PUBLICATIONS

Bocciarelli et al., "Empowering business process simulation through automated model transformations," 2014, Proceedings of the Symposium on Theory of Modeling & Simulation—DEVS Integrative, Article No. 39, pp. 1-9.*

Oechsle et al., "JAVAVIS: Automatic Program Visualization with Object and Sequence Diagrams Using the Java Debug Interface (JDI)," 2002, S. Diehl (Ed.): Software Visualization, LNCS 2269, pp. 176-190.*

Massoni et al., "A Model-driven Approach to Formal Refactoring", 2005, OOPSLA '05 Companion to the 20th annual ACM SIGPLAN conference on Object-oriented programming, systems, languages, and applications, pp. 124-125.*

IBM: List of IBM Patents or Patent Applications Treated As Related (Appendix P), Jul. 21, 2015, pp. 1-2.

U.S. Appl. No. 14/799,602, filed Jul. 15, 2015, entitled: "Method and System for Model Driven Development", pp. 1-35.

Rath et al., "Live Model Transformations Driven by Incremental Pattern Matching", ICMT 2008, LNCS 5063, pp. 107-121.

Brown et al., "An introduction to Model-Driven Architecture (MDA), Part II: Lessons from the design and use of an MDA toolkit", IBM developerWorks, Apr. 15, 2005, pp. 1-21.

Garcia-Diaz et al., "Performing Incremental Generation of Code in Model-driven Engineering", Journal of Research and Practice in Information Technology, vol. 44, No. 4, Nov. 2012, pp. 365-386.

Triebsees, "Constraint-based Model Transformation: Tracing the Preservation of Semantic Properties", Journal of Software, vol. 2, No. 3, Sep. 2007, pp. 19-29.

Taft, "Taking COBOL to the Cloud", http://www.eweek.com/c/a/Application-Development/Taking-COBOL-to-the-Cloud/, Posted Nov. 14, 2008, pp. 1-8.

Chinese Application No. 201410498508.9, filed Sep. 25, 2014, entitled: "Method and System for Model Driven Development" pp. 1-30.

Pending U.S. Appl. No. 14/799,602, filed Jul. 15, 2015, entitled "Method and System for Model Driven Development", pp. 1-35.

* cited by examiner

```
3100-CALL-CCMPAR2-RTN.
    MOVE C-CM-FUN-INQUIRE          TO I-FUN-CODE  OF PCCMPAR2.
    MOVE SYS-BRANCH-STD            TO I-OPUN-COD  OF PCCMPAR2.
    MOVE C-CM-TEAM-TWO             TO I-PARM-TYP  OF PCCMPAR2.
    CALL "CCMPAR1" USING AIF-AREA
                         PCCMPAR2
                         SYS-AREA.
    PERFORM 9999-MESSAGE-HANDLE-RTM.
    IF O-MSG-TYPE OF PCCMPAR2 NOT = SPAC
    THEN
        MOVE O-RTN-CODE OF PCCMPAR2 TO AI
        PERFORM 9999-MESSAGE-HANDLE-RTM
    END-IF.

5000-FUNCTION-PROCESS-RTM.
    IF SYS-TX-TYP = C-CLG-TXT-EC
    THEN
        PERFORM 5100-DEP-PASSBK-RTM.        ← 310
        IF TFT-TX-TYP = C-CM-TXTYP-TR
            PERFORM 5200-TR-PROCESS-RTN
        END-IF
    END-IF.
```

```
5100-DEP-PASSBK-RTM.
    IF SYS-TX-TYP = C-CLG-TXT-WOR
    THEN
        MOVE IO-ACCT-NO            TO I-ACCT-NO   OF PKSAACN1
        MOVE TXR-ACCT-NO OF APP-TXR-NORMAL
                                   TXR-ACCT-NO OF APP-TXR-NORMAL OF PKSADEP1
    ELSE
        MOVE TXR-ACCT-NO OF APP-TXR-NORMAL
                                   TO I-ACCT-NO   OF PKSADEP1
    END-IF.
    PERFORM 5110-CALL-KSADEF1-RTM.           ← 330
    MOVE C-PZZZ1130 OF PKSADEP1  TO PZZZ1030.
    IF TFT-TX-TYP = C-CM-TXTYP-CASH
    THEN
        MOVE TFT-TX-TYP            TO FM-TX-TYP   OF PZZZ1030
        MOVE "001"                 TO FM-SEQ-NO   OF PZZZ1030
        MOVE "PZZZ1030"            TO PZZZ1130-FORMID OF PZZZ1030
    ELSE
        INITIALIZE                 PZZZ1130-FORMID OF PZZZ1030
    END-IF.
```

METHOD AND SYSTEM FOR MODEL DRIVEN DEVELOPMENT

BACKGROUND

The present invention relates generally to the field of program development, and more particularly to a method for model driven development.

Model driven development (MDD) is an efficient program development mode that, for example, uses various models such as business rule model. MDD may be used to provide an abstract definition for an application or a business. For example, the model may define business rules or logic. It is known that such model may be transformed into executable program code. An MDD model may use Java code to generate a model through transforming an EMF (Eclipse Modeling Framework) model. Through use of a model and its transformation, the logic and rule of an application to be developed may be decoupled from bottom-layer program code, which is beneficial to enhance the flexibility of program development and maintenance.

After program code is generated based on the model, a developer may update the program code as required. For example, a developer may amend a part of program code, add new program code, etc. Some updates of the program code might be important and should be preserved. In other words, when the model is subject to subsequent re-transformation to generate new program code, the previous code update should be embodied in the new program code.

For an object-oriented programming language, the program code is written on the basis of methods. In this case, an annotation or keyword may be used to readily indicate a code portion that needs to be preserved. For example, in Java, an annotation "@preserve" may be used to indicate a method that needs to be preserved. Additionally, when performing a retransmission to the model, a code snippet of the method associated with "@preserve" may be preserved in the newly generated program code.

In various fields, such as, electrical power, financing, and banking, many applications are developed using non-object-oriented programming languages. For example, many applications implemented in banking are developed using COBOL, C language, or other process-oriented languages. Traditionally such programming languages cannot effectively indicate which snippets in the program code need to be preserved upon model retransformation. Therefore, some updated code snippets may be lost upon retransforming the model.

SUMMARY

Embodiments of the present invention disclose a system and computer program product for providing a technical solution for model driven development. Program code is analyzed to determine the execution sequence of states of the program code. The program code is generated by performing a first transformation to a model. The model includes an abstract description of a business implemented by the program code. At least part of the statement of the program code is grouped into functional blocks. A visual representation of the program code is created. The visual representation is based on the execution sequence and the functional blocks. A code snipped is determined to be preserved in the program code based on a user's annotation of the visual representation. The code snippety is to be preserved in new program code generated by performing a second transformation to the model. The second transformation is executed after the first transformation.

According to the embodiments of the present invention, even for a non-object-oriented programming language, the program code generated through model transformation may be presented to a user in a visual manner. In this way, the user can conveniently, accurately, and effectively designate a code snippet that should be preserved in the code. In this way, in the subsequent retransformation of the model, the code snippet designated by the user may be well preserved. Other features and advantages of the present invention may become easily comprehensible through the description infra.

DETAILED DESCRIPTION

The present invention may be a system and/or a computer program product. The system or computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It may be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
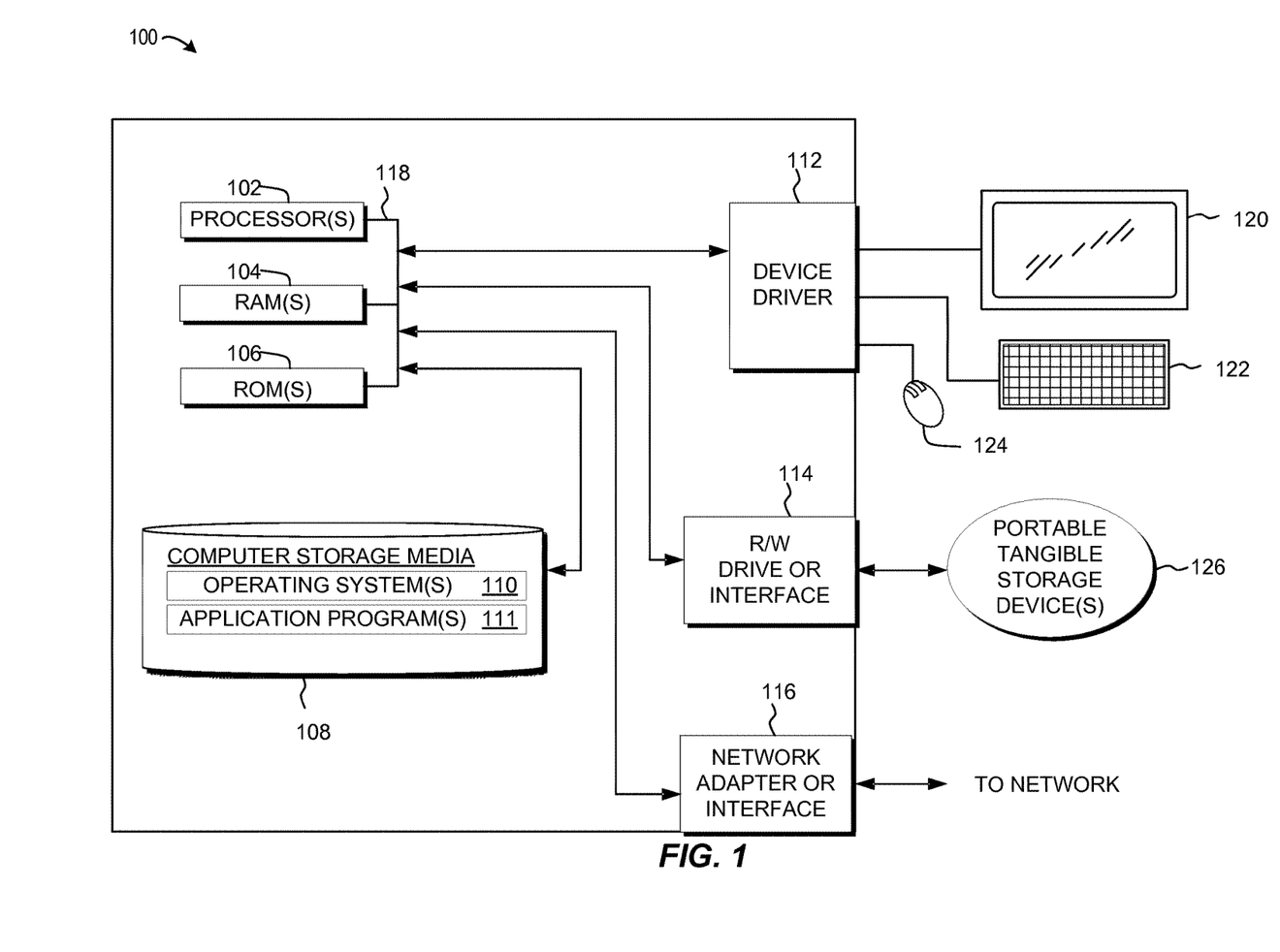
FIG. 1 depicts a block diagram of components of a computer system, in accordance with an embodiment of the present invention.

The present invention will now be described in detail with reference to the Figures. FIG. 1 depicts a block diagram of components of an exemplary computing system, generally designated 100, in accordance with an embodiment of the invention. It should be appreciated that FIG. 1 provides only an illustration of one implementation and does not imply any limitations with regard to the environments in which different embodiments may be implemented. Many modifications to the depicted environment may be made.

Computing system 100 may include one or more processors 102, one or more computer-readable RAMs 104, one or more computer-readable ROMs 106, one or more computer readable storage media 108, device drivers 112, read/write drive or interface 114, network adapter or interface 116, all interconnected over a communications fabric 118. Communications fabric 118 may be implemented with any architecture designed for passing data and/or control information between processors (such as microprocessors, communications and network processors, etc.), system memory, peripheral devices, and any other hardware components within a system.

One or more operating systems 110, and one or more application programs 111, for example, a program product having a set of program modules that are configured to carry out the functions of an embodiment of the invention, as may be further depicted and described below, may be stored on one or more of the computer readable storage media 108 for execution by one or more of the processors 102 via one or more of the respective RAMs 104 (which typically include cache memory). In the illustrated embodiment, each of the computer readable storage media 108 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing system 100 may also include an R/W drive or interface 114 to read from and write to one or more portable computer readable storage media 126. Application programs 111 on computing system 100 may be stored on one or more of the portable computer readable storage media 126, read via the respective R/W drive or interface 114 and loaded into the respective computer readable storage media 108.

Computing system 100 may also include a network adapter or interface 116, such as a TCP/IP adapter card or wireless communication adapter (such as a 4G wireless communication adapter using OFDMA technology). Application programs 111 on computing system 100 may be downloaded to the computing device from an external computer or external storage device via a network (for example, the Internet, a local area network or other wide area network or wireless network) and network adapter or interface 116. From the network adapter or interface 116, the programs may be loaded onto computer readable storage media 108. The network may comprise copper wires, optical fibers, wireless transmission, routers, firewalls, switches, gateway computers and/or edge servers.

Computing system 100 may also include a display screen 120, a keyboard or keypad 122, and a computer mouse or touchpad 124. Device drivers 112 interface to display screen 120 for imaging, to keyboard or keypad 122, to computer mouse or touchpad 124, and/or to display screen 120 for pressure sensing of alphanumeric character entry and user selections. The device drivers 112, R/W drive or interface 114 and network adapter or interface 116 may comprise hardware and software (stored on computer readable storage media 108 and/or ROM 106).

Hereinafter, the mechanism and principle of embodiments of the present invention may be described in detail. Unless otherwise stated, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms may be provided in the description infra.

Figure 2:
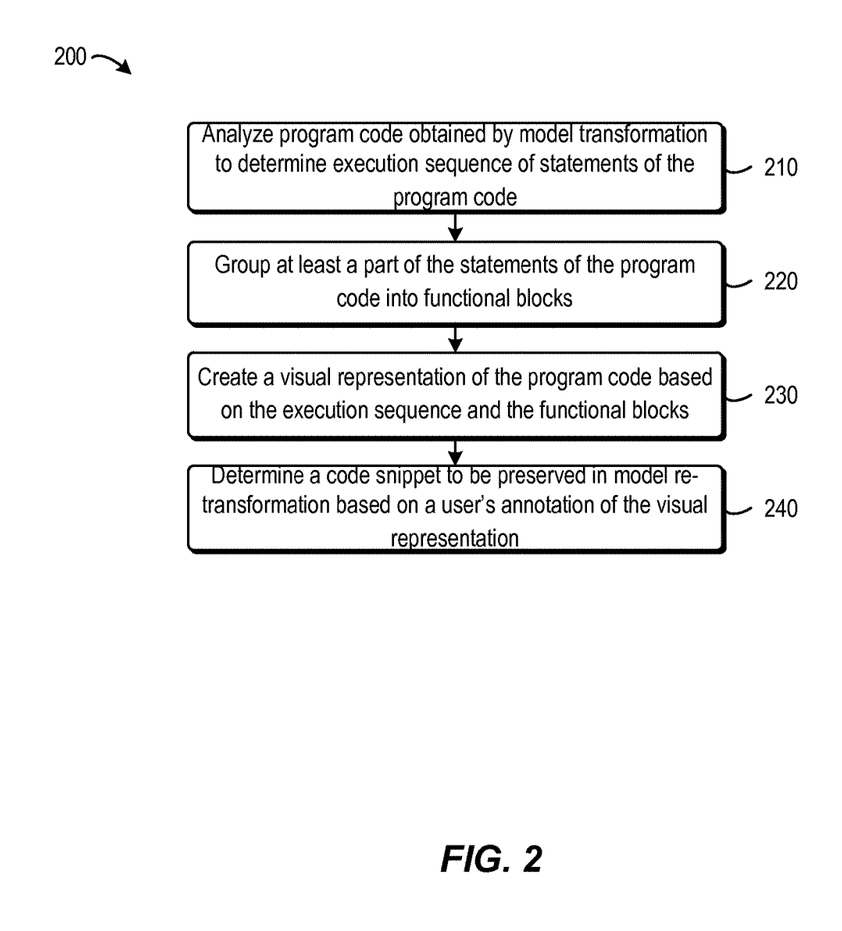
FIG. 2 is a flowchart depicting operational steps of an application within the computing system of FIG. 1, for model driven development, in accordance with an embodiment of the present invention.

FIG. 2 is a flowchart depicting operational steps of an application within computing system 100 of FIG. 1, for model driven development, in accordance with an embodiment of the present invention. FIG. 2 shows a flow diagram of a method, generally designated 200, for model driven development according to the embodiments of the present invention. Traditionally, for program code generated through model transformation, especially the program code written by non-object-oriented programming language, a user has limited capability to designate which code snippets should be preserved in model retransformation. This limitation may be overcome with model driven development. It would be appreciated through the following description that this problem can be effectively solved using method 200.

The steps of method 200, described below, implement the common business-oriented language, or COBOL, which is a compiled English-like computer programming language designed for business use. COBOL is merely an example of a typical computer programming language that can be used in an embodiment of the present invention, for example, C or other object-oriented programming languages can also be implemented.

In an embodiment, program code is analyzed to determine execution sequence of statements of the program code, in step 210. Code parsing may be implemented by a code analyzer, a parser, or a compiler. In various embodiments, the program code analyzed at step 210 is generated based on a model. This transformation of the model for generating processed program code in step 210 is called the "first transformation."

The model in step 210 defines a business being implemented by the program code. Specifically, the model comprises an abstraction description of a corresponding business, while the business is implemented by the program code generated based on the model. For example, the model may define functions, flows, control rules, and/or logic of the business to be implemented. Any model supporting model driven development may be used in combination with the embodiments of the present invention, including, but not limited to: enterprise structure model, technical structure model, field model, user interface model, database modeling, business rule model, system deployment model, or testing model. The model may be used in any appropriate manner, for example, using a uniform modeling language (UML) or an extensible markup language (XML).

By transforming the model program code, a corresponding business application may be generated. For example, program code implementing functions described by various nodes in the model may be generated. The generated program code may be organized, based on the relationship among the nodes. Model-based code generation is known in the art.

In an embodiment, execution logic of the program code may be analyzed in step 210 to determine the execution sequence of the statements of the program code, in that the program code is executed sequentially. However, when a statement causing execution jump, or "jump statement," in the program code exists, the program code will not be executed sequentially. Therefore, in various embodiments, a jump statement in the program code may be searched. With the COBOL language as an example, jump statements include, "IF," "THEN," "ELSE," "END-IF," "PERFORM," or "CALL." These are merely examples of jump statements and should not be construed as an exhaustive list. Jump statements also change depending on the programming language being implemented.

Based on the jump statement, a branch where the execution jump occurs in the program code may be identified. Based on a backbone part sequentially executed and one or more branch parts identified in the program code, the execution sequence of statements of the program code may be determined.

In step 220, a part or all of the statements of the program code are grouped into functional blocks. A functional block may also be called a "paragraph," referring to program code snippets for implementing relatively independent one or more functions. Those skilled in the art would appreciate that in an object-oriented programming language such as Java or C++, each method may be regarded as a functional block. However, in a non-object-oriented programming language such as COBOL, the program code is written in a process-oriented manner. Therefore, the functional block cannot be directly extracted from the code.

In an embodiment, the control flow of the program code may be parsed based on a predefined keyword included in the program code, to determine a functional block in the program code. With the COBOL programming language as an example, a "PERFORM" expression may be searched in the program code, and the program code invoked by the "PERFORM" expression is identified as a functional block.

Figure 3:
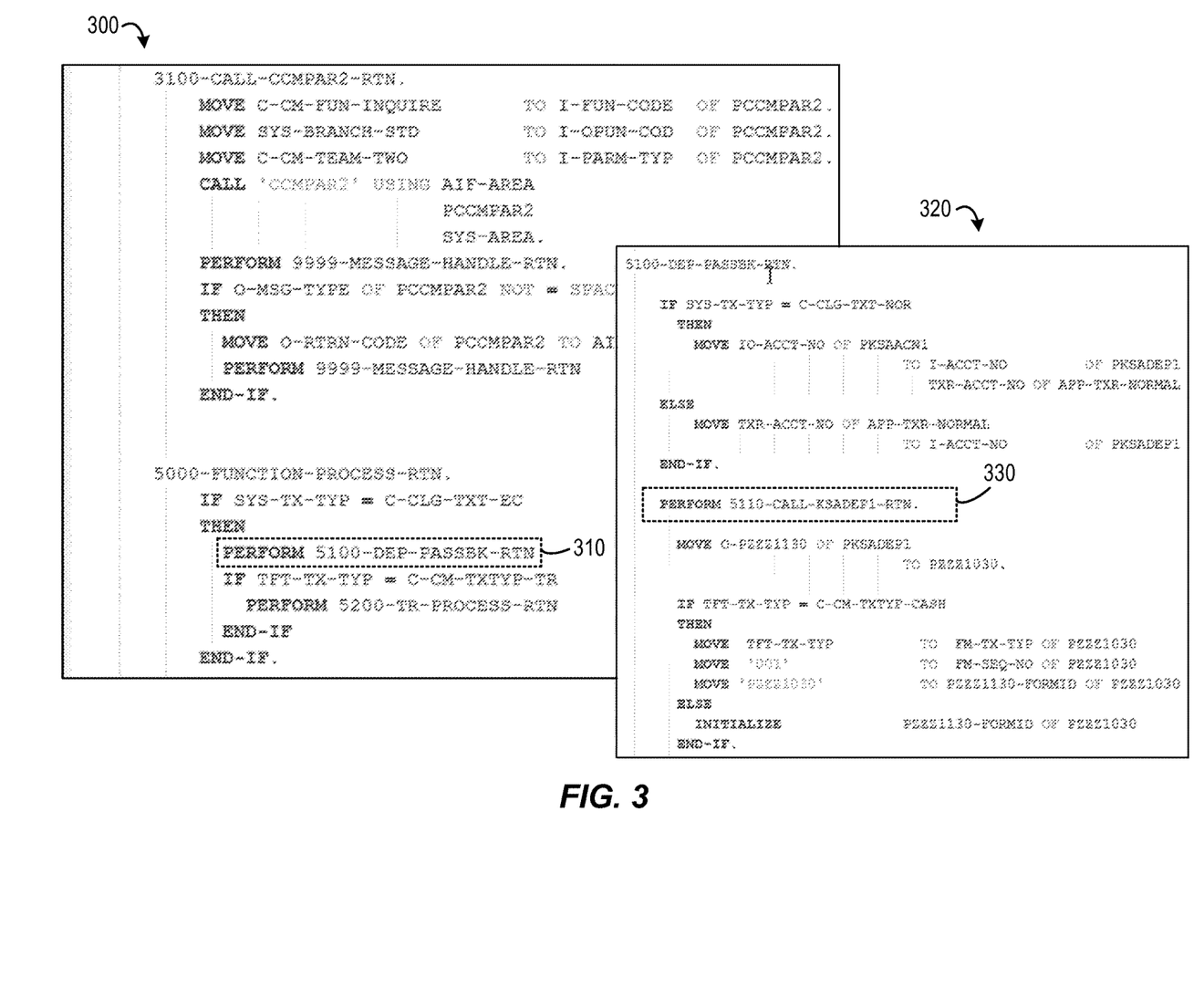
FIG. 3 illustrates a schematic diagram of program code written in COBOL programming language, in accordance with an embodiment of the present invention.

Referring now to FIG. 3, FIG. 3 illustrates a schematic diagram of program code written in COBOL programming language, as an example of the PERFORM expression in step 220. FIG. 3 includes program code 300 and process 320. Program code 300 includes PERFORM expression 310, which performs process 320. Therefore, the process 320 may be identified as a functional block. Identifying the functional block may be performed by nesting. For example, the process 320 includes the PERFORM expression 330. Therefore, a process, for example process 320, associated with the expression, for example PERFORM expression 330, is also identified as a functional block etc.

The PERFORM expressions 310 and 330 are only examples that may be used to parse the keywords of the control flow and is not intended to limit the embodiments of the present invention. For example, in an embodiment of program code 300, written in the COBOL programming language, a "CALL" expression may be used to identify a functional block. In various embodiments implementing different programming languages, different keywords may be used to parse the control flow of the program code.

Returning to FIG. 2, it should be appreciated that although step 210 is performed prior to step 220 in FIG. 2 and in the above description, it is only for illustration purposes and not intended to limit the scope of the present invention in any manner. In one embodiment, step 220 may be performed prior to step 210. Alternatively, performing steps 210 and 220 in parallel may also be feasible.

In step 230, a visual representation of the program code is created based on the statement execution sequence determined in step 210 and the functional block determined in step 220. In an embodiment, the visual representation in step 230 is a graphical representation. For example, a flow diagram may be used to represent the program code, for example program code 300. In particular, a structure of the flow diagram may be determined based on the statement execution sequence of the program code. One or more graphical elements in the flow diagram may correspond to a functional block in the program code. Of course, one or more graphical elements in the flow diagram may also be directly represented by the statements in the program code.

Figure 4:
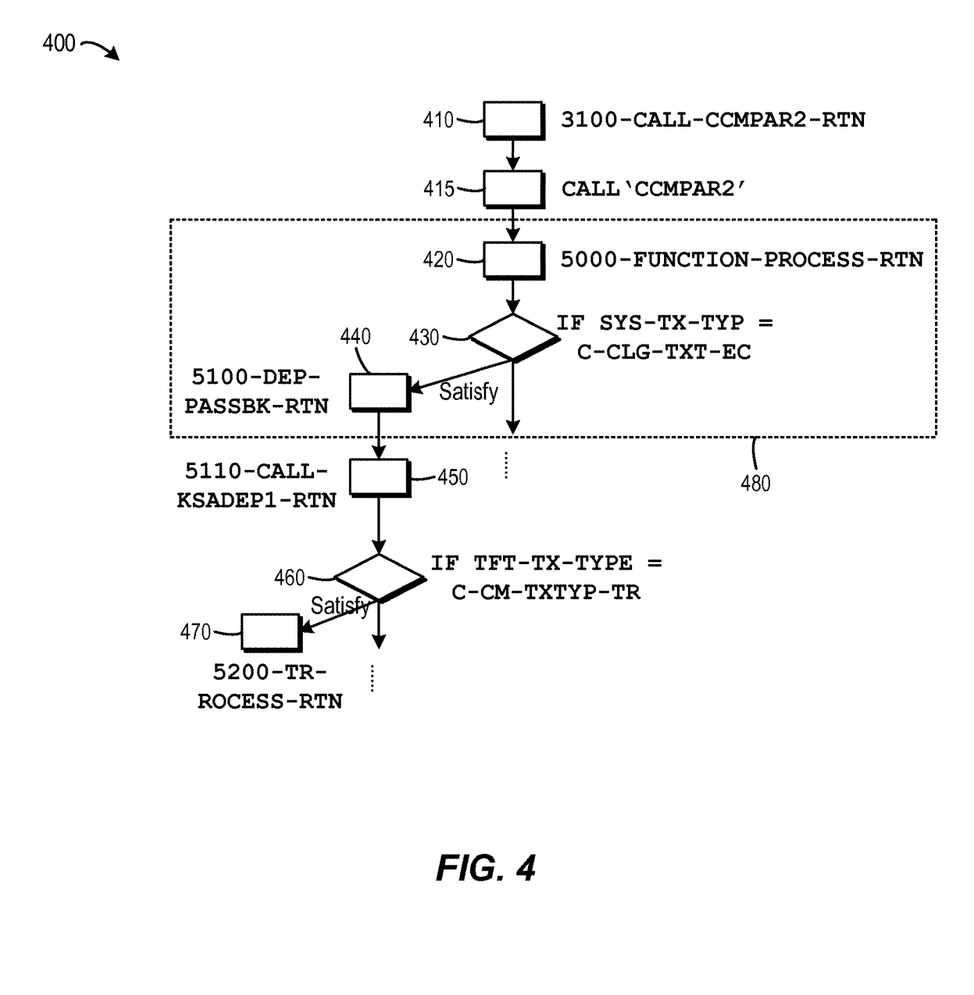
FIG. 4 illustrates a schematic diagram of a graphical representation of an application, in accordance with an embodiment of the present invention.

Referring now to FIGS. 3 and 4, FIG. 4 illustrates a schematic diagram of a graphical representation of part of program code 300. FIG. 4 illustrates an example implemented as a flow diagram, generally designated 400. The overall structure of the flow diagram 400 is determined based on the statement execution sequence of program code 300 as analyzed in step 210. Flow diagram 400 includes the graphical elements 410, 420, 440, 450, and 470 which represent functional blocks in program code 300. Some other graphical elements 415, 430, and 460 are statements in program code 300. By presenting the flow diagram 400 of the program code 300 to the user, the user can view the logic and context of the program graphically. This may help the user determine which program snippets in the program code need to be preserved.

In an embodiment, the user may interact with a display depicting block 480 of flow diagram 400 of the program through a pointing device, for example, a mouse. Graphical elements 420, 430, and 440 within the block 480 may be selected. The codes corresponding to the graphical elements 420, 430, and 440 may be determined to be preserved. It would be appreciated that this is only exemplary, not intended to limit the scope of the present invention in any manner. Any currently known or future developed graphical element selection manners are feasible.

For each graphical element selected by the user, a statement, which corresponds to the graphical element, in the program code may be determined. If the graphical element is one or more statements, it may be determined directly that these statements should be preserved in retransformation. If the graphical element corresponds to a functional block, this functional block may be determined as a code snippet that should be preserved. If the content corresponding to the graphical element includes semantic content of a variable or process, the variable or process corresponding to the semantic content may be determined based on the vocabulary. Therefore, variable or process may be determined as the part that should be preserved.

For a non-object-oriented programming language such as COBOL, traditionally, a user may not be able to designate code snippets in the code which need to be preserved during model retransformation conveniently, effectively, and accurately. By presenting the semantic content of a variable or process, the user may designate the code snippets that may be preserved more conveniently and accurately.

It should be noted that the flow diagram 400 is only an example of a graphical representation of program code 300. In other embodiments, any other types of graphical representation may be used, including, but not limited to, graph, tree, pipeline graph, or UML graph. Besides the graphical representation, in step 230 of FIG. 2, other visual representation of program code 300 may be created. For example, in one embodiment, a textual representation of program code 300 may be generated based on the statement execution sequence and the functional blocks, for example, pseudo code. Animation, video, multimedia, rich media, and any other form of visual representation may be feasible. The scope of the present invention is not limited in this respect.

In the visual representation of program code 300, descriptive information associated with statements and/or functional blocks of program code 300 may have a higher readability and may be presented to the user. In various embodiments, the model and/or the program code generated based on the model may have an associated vocabulary. The vocabulary may be used to define variable names, process names, or semantic meanings of other elements in the model and/or program code 300. For example, in the COBOL programming language, the semantic content of the variables and processes used in the program code, for example, program code 300, may be defined in a file called "Copybook." The Copybook file may act as a vocabulary. In various embodiments, a vocabulary may be implemented using any appropriate form of file or other data structure. For example, Copybook may include a header file (e.g., a file with an affix name ".h" in the C language). Alternatively, the Copybook may be implemented using any appropriate technology such as table in a database, textual file, or XML file.

Figure 5:
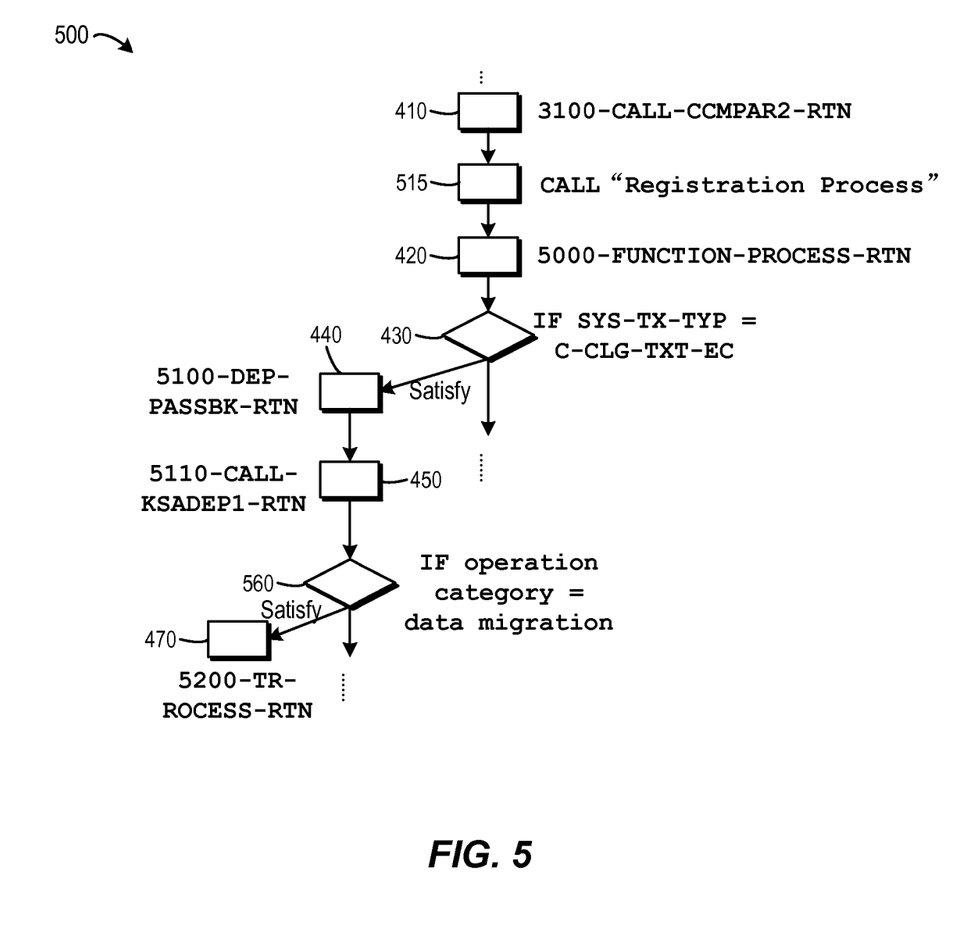
FIG. 5 illustrates a schematic diagram of a graphical representation of program code, in accordance with an embodiment of the present invention.

Referring now to FIGS. 2, 3, 4 and 5, semantic meanings of elements such as variables and processes in program code 300 may be determined through accessing a vocabulary. In the visual representation generated in step 230, semantic content of these variables or processes may be presented to the user. In an exemplary embodiment, FIG. 5 illustrates a schematic diagram of a graphical representation of program code 300, generally designated 500. Compared with the graphical represented of flow diagram 400 illustrated in FIG. 4, graphical representation 500 includes names of some variables and processes that are replaced with associated semantic content. The content displayed by the graphical element 415 in the flow diagram 400 contains the original process name "CCMPAR2." It may be determined through accessing the vocabulary that the semantic content of the process CCMPAR2 is "registration process." Therefore, the corresponding graphical element 515 of the graphical representation 500, replaces the process name CCMPAR2 with its semantic content registration process. Similarly, according to the vocabulary, the variable names "TFT-TX-TYPE" and "C-CM-TXTYP-TR" at graphical element 560 are replaced with their semantic meanings "operation category" and "data migration," respectively.

It should be appreciated that the variable and process name replacements associated semantic content in FIG. 5 merely act as an example and may not occur. In various embodiments, the names of the variables/processes and associated semantic content may be simultaneously displayed. The scope of the present invention is not limited in this aspect.

Through using semantic content of variables and/or processes in the graphical representation of the program code, a human user may be able to grasp the logic and overall context of the program code, for example program code 300. Therefore, the user may be more effective in determining which code snippets should be preserved. In the graphical representation of program code, it may not be compulsory to use the semantic content of the variables and/or processes. In one embodiment, the original names of the variables or process in the program code may be used in graphical representation of program code 300.

Referring again to FIG. 2, in step 240, one or more code snippets are determined to be preserved in the program code based on a user's annotation to the graphical representation generated and presented in step 230. In the subsequent model retransformation, these determined code snippets may be preserved in the newly generated code. Each code snippet comprises one or more statements. In an embodiments, when performing subsequent transformations, or "second transformations," to the model, the code snippets determined in step 240 may be preserved in the new program code generated in the second transformation.

In an embodiment, after a graphical representation of the program code 300 is displayed to the user, the user may annotate one or more parts of the displayed program code 300. For example, an interactive selection tool may be provided to the user to allow the user to select one or more graphical elements in the graphical representation. The user may select a graphical element through clicking onto the graphical element. Alternatively, it is allowed that the user selects more graphical elements once through any appropriate manner of gesture, combined keys, etc.

Figure 6:
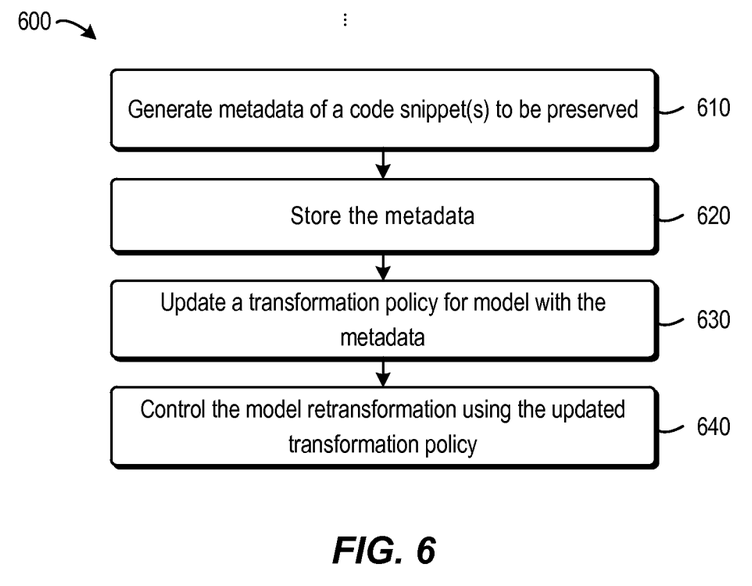
FIG. 6 illustrates a schematic diagram of method for preserving a user-designated code snippet in model retransformation, in accordance with an embodiment of the present invention.

In reference to FIGS. 2 and 6, in various embodiments, during the model retransformation process, the code snippets may be determine determined in step 240 to be preserved in the newly generated program code. FIG. 6 illustrates a schematic diagram of a method for preserving a user-designated code snippet in model retransformation, generally designated 600, in accordance to an embodiments of the present invention.

In step 610, metadata describing how the code snippet are preserved, as determined in step 240, is generated. In an embodiment, common metadata may be generated for all snippets to be preserved in the program code. In an additional embodiment, metadata may be generated for each code snippet to be preserved.

In an embodiment, metadata may describe the location of each code snippet to be preserved in the program code, for example, program code 300. Metadata may indicate a functional block using an identifier and/or process name of the functional block in the program, or other related information.

In an embodiment, metadata may describe a start line number and an end line number of each code snippet to be preserved in the program code. In another embodiment, the metadata may describe the start line number and the number of lines and/or end line number and the number of lines of each code snippet to be preserved. In another embodiments, the metadata may describe identification information of at least one preceding code snippet and at least one subsequent snippet of each code snippet to be preserved. It would be appreciated that the specific content of metadata may be changed, as long as it can describe the location of the code snippet in the program code, for example, program code 300.

In an embodiment, the metadata may describe any information related to the code snippet. For example, the metadata may describe the creation time, creator, modification time, modifier, and the like of the code snippet to be preserved. In another example, the metadata may indicate an insertion location of the code snippet to be preserved in the new program code generated by model retransformation. For example, the sequence of each code snippet may be in the original program code and the new program code. Therefore, the insert location in the new program code, may be indicated by at least one preceding code snippet and/or at least one subsequent code snippet with respect to the code snippet to be preserved in the original program code. This is merely an example as it is also feasible to indicate the insert position with the line number and other information.

In step 620 of FIG. 6, the method 600 stores metadata. The metadata may be stored in a data store in memory independent of the program code. For example, the metadata and the program code may be stored in mutually independent files. For example, damage to the metadata due to migration or disruption of the program files may be avoided by independent file storing. However, independent storage is merely an example of the file storage and may not occur. In various embodiments, the metadata and the program code may be stored in a single file.

In various embodiments, metadata may be formatted, for example, the metadata may be implemented by XML. The following table (T1) illustrates an example of an XML file snippet and associated metadata. For example, T1 illustrates metadata associated with code snippets 5000 and 5100 as illustrated in FIG. 3. In T1, the location of a code snippet is indicated using the start line number (from) and end line number (to). However, this is only exemplary, and any other manners are feasible. Additionally, it is not compulsory that the metadata has to be implemented using an XML file. For example, in the alternative embodiment, it is likewise feasible to save metadata using a textual file, or a database table.

TABLE 1

```
<?xml version="1.0"?>
- <marker>
  - <body>
    - <paragraph Id="5000-FUNCTION-PROCESS-RTN">
        <line to="515" from="512"/>
      </paragraph>
    - <paragraph Id ="5100-DEP-PASSBK-RTN">
        <line to="596" from="584"/>
      </paragraph>
  </body>
</marker>
```

In step 630, a transformation policy for the model is updated using metadata. The transformation policy may be used to control the transformation from model to code. For example, the transformation policy may control how to transform a node in the model to a corresponding program code or how to organize the program code based on the relationship between nodes in the model. According to an embodiments, by updating the transformation policy using the metadata of the code snippet to be preserved, the updated transformation policy may have a list or database in memory of which code snippets should be preserved in the new program code generated by the retransformation. This updated transformation policy is called "retransformation policy."

In step 640, a second transformation of the model, or retransformation, is controlled based on the retransformation policy generated in step 630. Specifically, if the node corresponding to the code snippet to be preserved is present in the mode, a corresponding code snippet may be directly generated through transforming the node. If the model does not have a node corresponding to the given code snippet to be preserved, the given code snippet may be retrieved from the previously generated program code based on metadata of the given code snippet. As described above, the metadata may indicate the location of the code snippet in the previously generated program code. Therefore, the code snippet may be retrieved based on the indicated location.

Method 600 is only exemplary and not intended to limit the scope of the present invention in any manner. According embodiments of the present invention, it is not compulsory to preserve the code snippet designated by the user through updating the transformation policy. For example, in various embodiment, each code snippet that should be preserved may be searched in the newly generated program code after completion of the model retransformation. If no code snippet to be preserved is found in the new program code, the code snippet may be inserted at an appropriate location in the new program code.

As an example, in reference to FIG. 2, insertion of the retrieved code snippet may be performed based on the statement execution sequence determined in step 210 in the method 200. As discussed above, for any code snippet to be preserved, the metadata may indicate the location at which the code snippet will be inserted into the new program code. The insert location may be indicated by at least one preceding code snippet and/or at least one of the following code snippets of the code snippets to be preserved. The location of the previous code snippet of the code snippet to be preserved in the new program code may be located based on the associated metadata. This may be implemented by searching the previous code snippet in the new program code and inserting the code snippet to be preserved at a location after the previous snippet. The code snippet determined in step 240 of the method 200 may be preserved at a correct location in the new program code that is generated through model retransformation.

Figure 7:
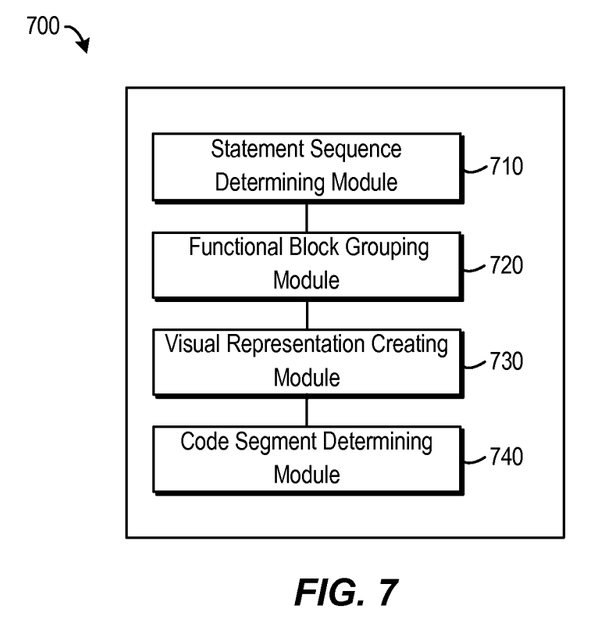
FIG. 7 depicts a block diagram of a system for model driven development, in accordance with an embodiment of the present invention.

In reference to FIG. 7, FIG. 7 depicts a block diagram of a system for model driven development, according to an embodiments of the present invention. FIG. 7 includes a system, generally designated 700. System 700 includes statement sequence determining module 710, functional block grouping module 720, visual representation creating module 730, and code snippet determining module 740.

Statement sequence determining module 710 may be configured to analyze program code to determine the execution sequence of statements of program code, for example, program code 300. The program code may be generated by performing a first transformation to a model, the model including an abstract description of a business implemented by the program code, as described above. Functional block grouping module 720 may be configured to group at least a part of the statements of the generated program code into functional blocks. Visual representation creating module 730 may be configured to create a visual representation of the generated program code based on the execution sequence and the functional blocks. Code snippet determining module 740 may be configured to determine a code snippet to be preserved in the generated program code, based on a user's annotation of the visual representation, and which code snippet will be preserved in new program code generated by performing a second transformation to the model, the second transformation being executed after the first transformation.

In an embodiment, functional block grouping module 720 may include a functional block determining module configured to parse a control flow of the program code based on a predefined keyword in the program code, to determine the functional block. Visual representation creating module 730 may include a graphical representation creating module configured to create a graphical representation of the program code based on the execution sequence and the functional blocks. Visual representation creating module 730 may include a semantics determining module configured to determine semantic content of a variable or process in the program code based on a vocabulary associated with at least one of the model and the program code; and a semantics presentation module configured to present the semantic content in the visual representation of the program code.

In various embodiments, system 700 may further include a metadata generating module configured to generate metadata associated with the code snippet and a policy updating module configured to update the transformation policy of the model using the associated metadata, to control the second transformation of the model.

In an embodiment, the metadata associated with a code snippet indicates the locations of the functional block to which the code snippet belongs in the program code. The location of the code snippet in the program code may be indicated by at least a start line number and an end line number of the code snippet in the program code, a start line number and the number of lines of the code snippet in the program code, an end line number and the number of lines of the code snippet in the program code, and/or at least one previous code snippets and at least one subsequent code snippet with respect to the code snippet in the program code. The metadata and the program code may be stored independently, as described above.

In an embodiment, the metadata may indicate a location of the code snippet that may be inserted into the new program code. For example, an insert location may be indicated by at least one previous code snippet and at least one subsequent code snippet with respect to the code snippet in the program code.

In various embodiments, system 700 may include a code snippet retrieving module, configured to retrieve the code snippet from the program code based on the metadata, in response to a node corresponding to the code snippet being absent in the model. System 700 may also include a code snippet inserting module configured to insert the code snippet into the new program code based on the execution sequence.

It should be appreciated that FIG. 7 does not show all optional modules or submodules that may be included in the system 700. All features and operations as described above are suitable for system 700, respectively. The partitioning of modules or submodules in system 700 is exemplary, rather than limitative, intended to describe its main functions or operations logically. A function of one module may be implemented by a plurality of other modules and a plurality of modules may be implemented by one module. The scope of the present invention is not limited in this aspect.

Additionally, the modules described in system 700 may be implemented by various means, including software, hardware, firmware or a combination thereof. For example, in various embodiments, the apparatus may be implemented by software and/or firmware. Alternatively, system 700 may be implemented partially or completely based on hardware. For example, by one or more modules in system 700 being implemented as an integrated circuit (IC) chip, an application-specific integrated circuit (ASIC), a system on chip (SOC), or a field programmable gate array (FPGA). The scope of the present intention is not limited to this aspect.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer system for model driven development, the computer system comprising:
   one or more computer processors;
   one or more computer-readable storage media;
   program instructions stored on the computer-readable storage media for execution by at least one of the one or more processors, the program instructions comprising:
   instructions to analyze program code to determine execution sequence of statements of the program code, the program code being generated by performing a first transformation to a model, the model including an abstract description of a business implemented by the program code;
   instructions to group at least a part of the statements of the program code into functional blocks;
   instructions to create a visual representation of the program code based on the execution sequence and the functional blocks, for display;
   instructions to determine a code snippet to be preserved in the program code, in response to receiving an annotation input of the visual representation, the code snippet to be preserved in new program code generated by instructions to perform a second transformation to the model, the second transformation being executed after the first transformation;
   instructions to generate, by the computer, metadata of the code snippet; and
   instructions to update, by the computer, a transformation policy of the model, wherein the transformation policy is based on the metadata to control the second transformation of the model, and a user selection of the visual representation of the program code based on the execution sequence and the functional blocks.

2. The system of claim 1, wherein the instructions to group at least a part of the statements of the program code into functional blocks further comprises:
   instructions to parse a control flow of the program code based on a predefined keyword in the program code to determine the functional blocks.

3. The system of claim 1, wherein the instructions to create a visual representation of the program code based on the execution sequence and the functional blocks further comprises:
   instructions to create a graphical representation of the program code based on the execution sequence and the functional blocks.

4. The system of claim 1, wherein the instructions to create a visual representation of the program code based on the execution sequence and the functional blocks comprises:
   instructions to determine semantic content of a variable or process in the program code based on a vocabulary associated with at least one of the model and the program code; and
   instructions to present the semantic content in the visual representation of the program code.

5. The system of claim 1, wherein the metadata indicates a functional block to which the code snippet belongs and a location of the code snippet in the program code.

6. The system of claim 5, wherein the location of the code snippet in the program code is indicated by at least one of:
   a start line number and an end line number of the code snippet in the program code;
   a start line number and the number of lines of the code snippet in the program code;
   an end line number and the number of lines of the code snippet in the program code; and at least one previous code snippet and at least one subsequent code snippet of the code snippet in the program code.

7. The system of claim 1, wherein the metadata and the program code are stored independently.

8. The system of claim 1, further comprising:
   instructions to retrieve the code snippet from the program code based on the metadata in response to a node corresponding to the code snippet being absent in the model; and
   instructions to insert the code snippet into the new program code based on the execution sequence.

9. The system of claim 1, wherein the metadata indicates a location at which the code snippet is inserted into the new program code.

10. A computer program product for model driven development, the computer program product comprising:
    one or more computer-readable storage media and program instructions stored on the one or more computer-readable storage media, the program instructions comprising:
    instructions to analyze program code to determine execution sequence of statements of the program code, the program code being generated by performing a first transformation to a model, the model including an abstract description of a business implemented by the program code;
instructions to group at least a part of the statements of the program code into functional blocks;
instructions to create a visual representation of the program code based on the execution sequence and the functional blocks, for display;
instructions to determine a code snippet to be preserved in the program code, in response to receiving an annotation input of the visual representation, the code snippet to be preserved in new program code generated by instructions to perform a second transformation to the model, the second transformation being executed after the first transformation;
instructions to generate, by the computer, metadata of the code snippet; and
instructions to update, by the computer, a transformation policy of the model, wherein the transformation policy is based on the metadata to control the second transformation of the model, and a user selection of the visual representation of the program code based on the execution sequence and the functional blocks.

11. The computer program product of claim 10, wherein the instructions to group at least a part of the statements of the program code into functional blocks further comprises:
instructions to parse a control flow of the program code based on a predefined keyword in the program code to determine the functional blocks.

12. The computer program product of claim 10, wherein the instructions to create a visual representation of the program code based on the execution sequence and the functional blocks further comprises:
instructions to create a graphical representation of the program code based on the execution sequence and the functional blocks.

13. The computer program product of claim 10, wherein the instructions to create a visual representation of the program code based on the execution sequence and the functional blocks comprises:
instructions to determine semantic content of a variable or process in the program code based on a vocabulary associated with at least one of the model and the program code; and
instructions to present the semantic content in the visual representation of the program code.

14. The computer program product of claim 10, wherein the metadata indicates a functional block to which the code snippet belongs and a location of the code snippet in the program code.

15. The computer program product of claim 14, wherein the location of the code snippet in the program code is indicated by at least one of:
a start line number and an end line number of the code snippet in the program code;
a start line number and the number of lines of the code snippet in the program code;
an end line number and the number of lines of the code snippet in the program code; and at least one previous code snippet and at least one subsequent code snippet of the code snippet in the program code.

16. The computer program product of claim 10, wherein the metadata and the program code are stored independently.

17. The computer program product of claim 10, further comprising:
instructions to retrieve the code snippet from the program code based on the metadata in response to a node corresponding to the code snippet being absent in the model; and
instructions to insert the code snippet into the new program code based on the execution sequence.

18. The computer program product of claim 10, wherein the metadata indicates a location at which the code snippet is inserted into the new program code.

* * * * *